(12) United States Patent
Harrington

(10) Patent No.: US 6,493,039 B1
(45) Date of Patent: Dec. 10, 2002

(54) METHOD AND APPARATUS FOR WHITE NOISE REDUCTION IN VIDEO IMAGES

(75) Inventor: Steven J. Harrington, Webster, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/232,652

(22) Filed: Jan. 19, 1999

(51) Int. Cl.[7] .............................................. H04N 5/213
(52) U.S. Cl. ........................ 348/618; 348/615; 348/912
(58) Field of Search ................................. 348/607, 615, 348/618, 912; 382/260, 275; 358/463, 465, 466

(56) References Cited

U.S. PATENT DOCUMENTS

| | | | | |
|---|---|---|---|---|
| RE30,468 E | * | 12/1980 | Dolby | ........................ 455/72 |
| 4,827,342 A | * | 5/1989 | Ohta et al. | ................... 358/167 |
| 5,097,336 A | * | 3/1992 | Kawasaki | .................... 358/166 |
| 5,389,978 A | * | 2/1995 | Jeong-Hun | ................... 348/622 |
| 5,400,151 A | * | 3/1995 | Okada | ......................... 358/340 |
| 5,818,972 A | * | 10/1998 | Girod et al. | ................ 382/260 |
| 5,901,178 A | * | 5/1999 | Lee et al. | ................... 378/240 |

* cited by examiner

Primary Examiner—Victor R. Kostak
(74) Attorney, Agent, or Firm—Oliff & Berridge, PLC

(57) ABSTRACT

A method and system for reducing white noise in images. The method does not require knowledge of the image blur or noise statistics, and can remove noise without causing excessive image blur. The image is separated into frequency bands which are then thresholded to remove small image changes, i.e. noise, while maintaining larger changes which are signals. The thresholded components are then recombined to produce an output image with reduced white noise.

10 Claims, 6 Drawing Sheets

METHOD AND APPARATUS FOR WHITE NOISE REDUCTION IN VIDEO IMAGES

BACKGROUND OF THE INVENTION

1. Field of Invention

This invention is related to noise reduction in video images. More particularly, this invention is directed to a system and method for reducing white noise in images.

2. Description of Related Art

Images, such as still images captured from video signals, can sometimes be quite noisy. This noise generally falls into one of two categories. The first category is "salt and pepper" noise. Salt and pepper noise is occasional, high-frequency light or dark pixels caused by electric pulses, such as from nearby engines or motors. The application of a median filter to images containing salt and pepper noise works well to clean up the noisy pixels in the image.

The second category of noise is white, or Gaussian, noise. White noise is a random noise throughout the image and is commonly seen in the "snowy" pictures from distant broadcast stations. Approaches to reducing white noise have been either through the application of a Wiener filter, or through averaging over several frames.

SUMMARY OF THE INVENTION

While salt and pepper and white noise each have filters that work well to clean-up the pixel errors in images, these filtering approaches may not always be practical. Specifically, the design of an optimal Wiener filter requires knowledge of the communication channel characteristics and of the particular noise statistics. Averaging images, which is a common approach to reducing white noise, requires the availability of several originally identical images. In video signals, this would require that no motion occur in the captured image. Neither of these approaches are possible if only a single image from an unknown source is available.

This invention provides systems and methods for reducing noise in images.

This invention separately provides systems and methods for reducing white noise in still images.

This invention separately provides systems and methods for decomposing a still image into a plurality of frequency bands and recomposing the still image from the filtered frequency bands.

This invention separately provides systems and methods for setting filtering parameters for a frequency band of a still image.

The various systems and methods of this invention reduce white noise by first applying band-pass filters to the image to decompose it into a sequence of frequency bands. A different threshold is then applied to each band. Small changes in the image are considered to be noise and are removed, while large changes are retained as the signal. The various threshold bands are then reassembled to produce the resultant image having reduced white noise content.

These and other features and advantages of this invention are described in or are apparent from the following detailed description of the preferred embodiments.

BRIEF DESCRIPTION OF THE DRAWINGS

The preferred embodiments will be described in detail, with reference to the following figures, wherein.

DETAILED DESCRIPTION OF PREFERRED EMBODIMENTS

Figure 1:
FIG. 1 is an exemplary captured image containing white noise.
Figure 2:
FIG. 2 is the image in FIG. 1 after white noise is removed according to the systems and methods of white noise reduction.

FIG. 1 is an exemplary image 10 containing white noise. The white noise appears as specks 20 throughout the image. FIG. 2 is the image 10' of FIG. 1 after white noise has been reduced according to the white noise reduction systems and methods of this invention from the exemplary image 10. As shown in FIGS. 1 and 2, the quantity of white noise, or specks 20, has been reduced, providing a clearer image 10'.

Figure 3:
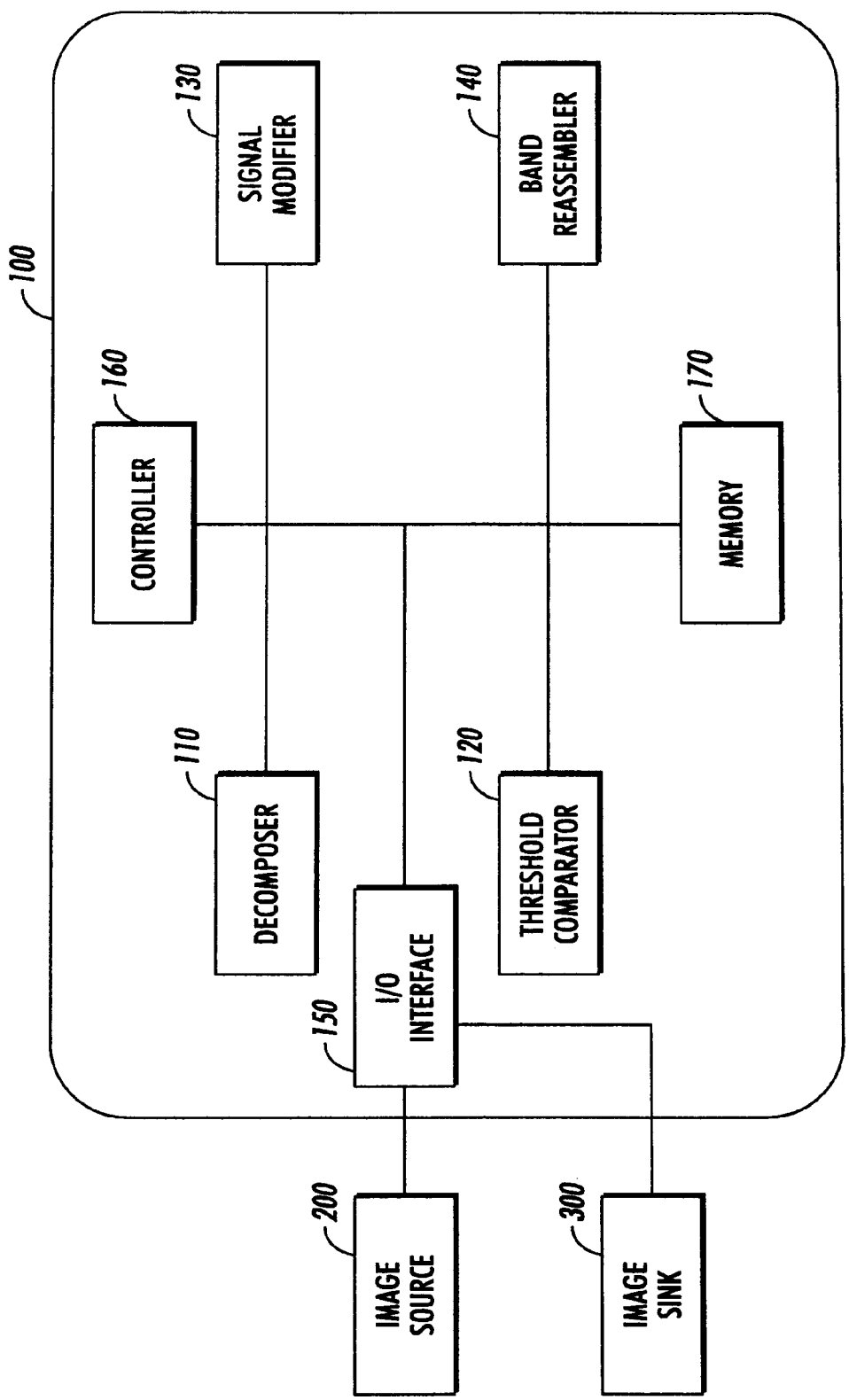
FIG. 3 is a functional block diagram of one exemplary embodiment of a white noise reduction system according to this invention.

FIG. 3 shows a functional block diagram of one exemplary embodiment of a white noise reduction system 100 according to this invention. As shown in FIG. 3, the white noise reduction system 100 includes a decomposer 110, a threshold comparator 120, a signal modifier 130, a band reassembler 140, an input/output interface 150 a controller 160 and a memory 170, interconnected by a data control bus 180.

The decomposer 110 decomposes the input image into frequency bands. The threshold comparator 120 determines the noise in each frequency band. The noise is then removed by the signal modifier 130. Band reassembler 140 recombines the thresholded frequency bands to output the filtered image.

The image data source 200 provides image data signals to the white noise reduction system 100 can be a video camera or any other source that is capable of providing image data to the I/O interface 150. The image source 200, thus may also be any one of a number of other image data sources, such as a scanner, a digital copier or a facsimile machine device, that is suitable for generating electronic image data, or a device suitable for storing and/or transmitting electronic image data, such as a client or server of a network.

An image for which white noise reduction is desired is input from the image data source 200 into the white noise reduction system 100 through the I/O interface 150 and, under control of the controller 160, is stored in the memory 170. The stored image is then output from the memory 170 to the decomposer 110 under control of the controller 160. The decomposer 110, upon receiving the input image, decomposes the input image into a number of frequency bands by determining the difference between filtered images. For example, the difference between an image filtered to contain only low frequencies and an image filtered to contain low and medium frequencies is the medium frequency band.

Each of the frequency bands is output from the decomposer 110 to the threshold comparator 120. The threshold comparator 120 determines the noise in each of the individual frequency bands. The frequency bands are output from the threshold comparator 120 to the signal modifier 130. The signal modifier 130 removes small signal changes in each of the frequency bands, while large changes in signal are retained the image. These small signal changes in the frequency bands are assumed to be noise, while the large signal changes are assumed to represent actual image data. The signal modifier 130 outputs the filtered frequency bands to the band reassembler 140. The band reassembler 140 re-combines the thresholded frequency bands generated by the decomposer 110. The re-combined filtered image output by the band reassembler 140 can be output to the image sink 300 through the I/O interface 150, and optionally can be stored in the memory 170 before being output.

However, it should also be appreciated that the image can be processed a scanline at a time, so that only a few scanlines of image are required for filtering. Thus, only a few input and filtered scanlines need be stored in the memory 170 at any one time.

Filtering to obtain the frequency bands in the decomposer 110 can be accomplished using box filters and can be efficiently carried out with the aid of a summed-area table. The summed-area table has values that correspond to the input image pixels, where the table value for each pixel contains a sum of all image pixel values of the image in the area above and to the left of the corresponding image pixel. Therefore, determining the summed-area table can be accomplished in a single pass through the image. In the following discussions, I[x, y] represents the pixel, or image, value of the pixel at a location (x, y) in the image. A[x, y] represents the summed-area value for the pixel at the location (x, y). The table values A[−1, y] and A[x, −1] are set to zero for all columns x and all rows, or scanlines, y of the image. A partial-scanned sum S is initialized to zero at the start of each line.

Beginning at the pixel at the location (0, y) for the current scanline y, the pixel value for each pixel in the current scanline y is added to the partial scanned sum S in order. Thus:

$$S_y = S_y + I[x,y] \tag{1}$$

The decomposer 110 then computes the summed-area value for each pixel of the current scanline y by adding the value of the partial-scanned sum $S_y$ for the current scanline y to the value of the summed-area table A for the pixel directly above the current pixel (x, y). That is:

$$A[x,y] = A[x,y-1] + S_y \tag{2}$$

With the summed-area table determined as set forth above, it is easy to determine the average intensity values for rectangular areas of the image. For example, a rectangular region around a selected pixel $(x_\phi, y_\phi)$ and having horizontal and vertical dimensions $2d_x+1$ and $2d_y+1$, respectively, the summed intensity $I_{sum}$ for the rectangular region is:

$$I_{sum}(x_0,y_0,d_x,d_y) = (A[x_0+d_x,y+d_y] - A[x_0+d_x,y_0-d_y-1] - A[x_0-d_x-1,y_0+d_y] + A[x_0-d_x-1, y_0-d_y-1]) \tag{3}$$

where $I_{sum}(x_0, y_0, d_x, d_y)$ is the summed intensity for a $(2d_x+1) \times (2d_y+1)$ rectangle centered on the pixel location $(x_0, y_0)$.

The average intensity $I_{av}$ for the selected pixel over the rectangular region is thus:

$$I_{av}(x_0,y_0,d_x,d_y) = I_{sum}(x_0,y_0,d_x,d_y)/((2d_x+1)(2d_y+1)) \tag{4}$$

Therefore, these average values provide a low-pass, box filtered image that can be used to quickly and easily decompose the image into bands.

The k image bands B can then be represented by:

$$B[x,y,k] = I_{av}[x,y,k,k] - I_{av}[x,y,k+1,k+1]; \tag{5}$$

where:

B[x, y, k] is the pixel value at pixel location (x, y) for the $k^{th}$ band; and $d_x = d_y = k$.

The image value I[x, y] is decomposed into the sum of k band values for the k image bands B and a final low-pass image $I_{av}$:

$$I(x,y) = B[x,y,0] + B[x,y,1] + \ldots + B[x,y,n] + I_{av}[x,y,n+1,n+1] \tag{6}$$

Eq. 6 is used to reconstruct the image after removing the white noise from the frequency bands.

The threshold comparator 120 determines the noise from the frequency bands by comparing the pixel value for the pixel B at location (x, y) for the $k^{th}$ band against a threshold T[k] for the $k^{th}$ band:

$$\text{if}(B[x,y,k] < T[k]) \text{ then } B[x,y,k] = 0 \tag{7}$$

where T[k] is the threshold value for the $k^{th}$ band.

The inventors have experimentally determined that decomposing the image into at least 6 bands, i.e., n=5, provides sufficient filtering to remove the white noise. With fewer bands, strong thresholding may damage the image while weaker thresholding fails to effectively remove the noise.

The signal modifier 130 then removes the small signal changes in the image, i.e., the changes that are considered to be noise, while maintaining the large signal changes in the image, i.e., the changes that are retained as image data. The band reassembler 140 reassembles the various thresholded frequency bands and outputs the resultant image.

In summary, the white noise reduction system 100 reduces the white noise by first applying a band-pass filter to the image to decompose the image into a sequence of frequency bands. A threshold is then applied to each band. Small signal changes detected in the image are considered to be noise and are removed from the image, while large signal changes are maintained as the image data. The noise reduction system 100 then reassembles the various thresholded frequency bands to produce the resultant image.

After examining the statistics of the image bands to determine how much thresholding is necessary and/or desirable, the inventors have determined that noise-free images have a large number of small values in the band-pass decompositions, while noisy images have a more uniform distribution of values. The ratio r[k] characterizes the amount of noise in the image:

$$r[k] = n_1(k)/n_2(k); \tag{8}$$

where $n_i(k)$ is the number of instances that a pixel in the $k^{th}$ band-pass image has a value of i. This ratio r[k] will typically be large for noise-free images but near 1 for very noisy images. Many thresholding schemes are possible. For example, a constant threshold value could be used. Alternatively, thresholds based on some other characteristic of the image could be generated. One exemplary heuristic for determining a threshold T[k] from this ratio r[k] is:

$$T[k] = 1/((\max(0,r[k]-1)/d[k] + c[k]) \tag{9}$$

where the parameters c[k] and d[k] are, for each band k=0 to 5,:

| k    | 0     | 1    | 2   | 3   | 4   | 5   |      |
|------|-------|------|-----|-----|-----|-----|------|
| c[k] | 0.025 | 0.04 | 0.1 | 0.2 | 0.3 | 0.4 |      |
| d[k] | 0.1   | 0.2  | 0.5 | 1.0 | 1.5 | 2.0 | (10) |

This technique cannot remove all of the high-frequency noise without blurring the image. However, the thresholding parameters c[k] and d[k] can be kept low enough that they do not remove too much of the image data, though this leaves some high-frequency noise to remain in the image. However, this technique can be combined with median filtering, which will reduce the high-frequency noise.

Figure 4:
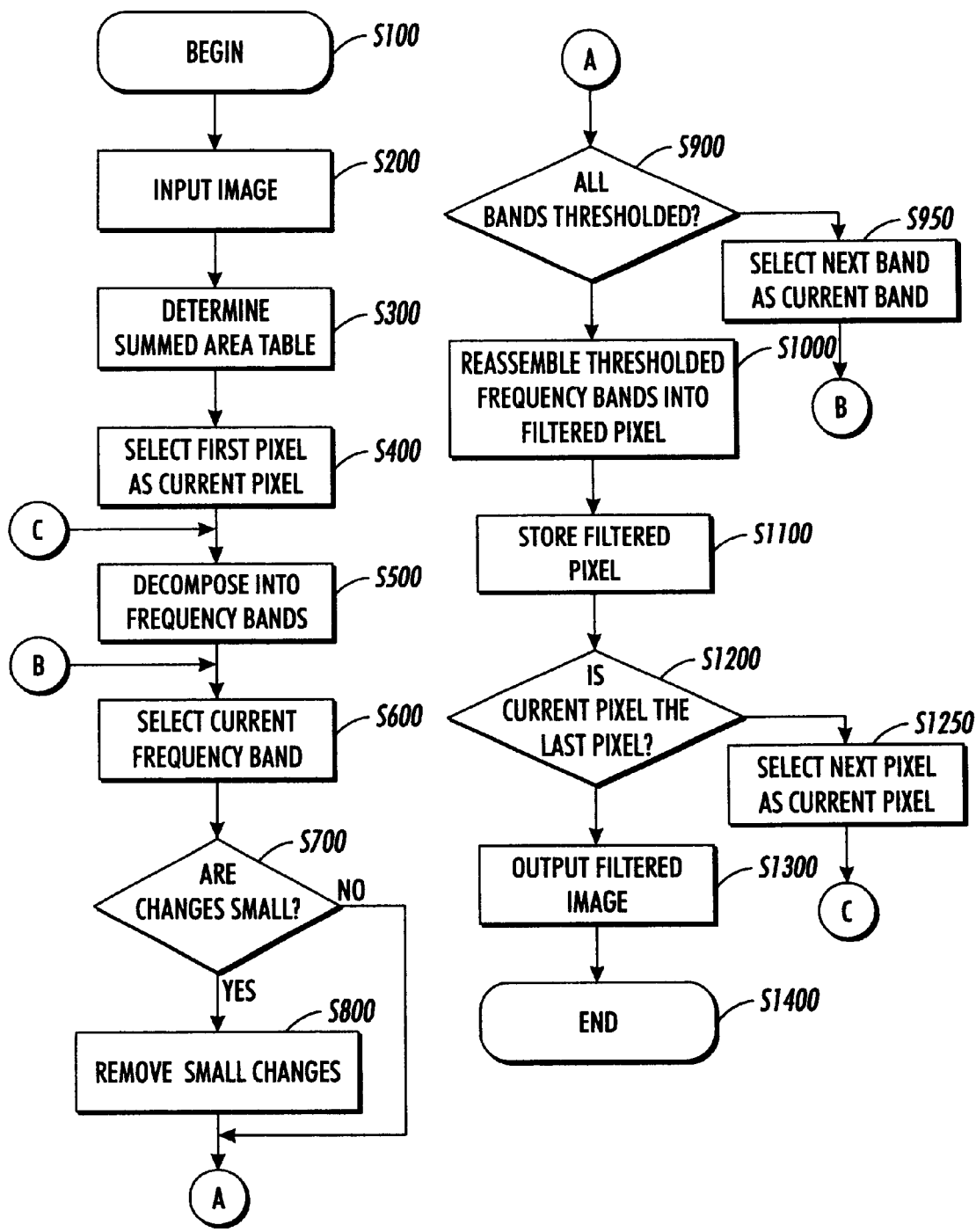
FIG. 4 is a flowchart outlining one exemplary embodiment of a method for reducing white noise according to this invention.

FIG. 4 outlines one method for reducing white noise in images according to this invention. Control begins in step S100. In step S200 an image is input. Then, in step S300, the summed-area table is determined. Next, in step S400, a first pixel of the image is selected as the current pixel for processing. Control then continues to step S500.

In step S500, the input pixel is decomposed into a sequence of frequency bands. Next, in step S600, the current frequency band is selected. Control then passes to step S700.

In step S700, a determination is made regarding the magnitude of the changes in the frequency bands. If the magnitude of the changes in the frequency bands are small, the changes are considered to be noise. Thus, control continues to step S800. However, if the magnitude of the changes in the frequency bands are large, control jumps to step S900.

In step S800, the changes in the frequency bands that were determined to be small in step S700 are removed from the signal. Control then continues to step S900.

In step S900, a determination is made as to whether all the frequency bands have been thresholded. If all bands have not been thresholded, control jumps to step S950. In contrast, if all the frequency bands have been thresholded, control jumps to step S1000.

In step S950, the next band is selected as the current band and control jumps back to step S600.

In step S1000, the thresholded bands are reassembled to produce the filtered pixel. Then, in step S1100, the filtered pixel is stored. In step S1200, a determination is made as to whether the current pixel is the last pixel. If the current pixel is not the last pixel, control continues to step S1250. In contrast, if the current pixel is the last pixel, control jumps to step S1300.

In step S1250, the next pixel is selected as the current pixel. Control then jumps back to step S500.

In step S1300, the filtered image is output. Then, in step S1400 the control sequence ends.

It should be appreciated that while the flowchart in FIG. 4 has been described in relation to reassembling the frequency bands after all bands have been thresholded, the reassembly of frequency bands in step S1000 could also occur before step S900.

Figure 5:
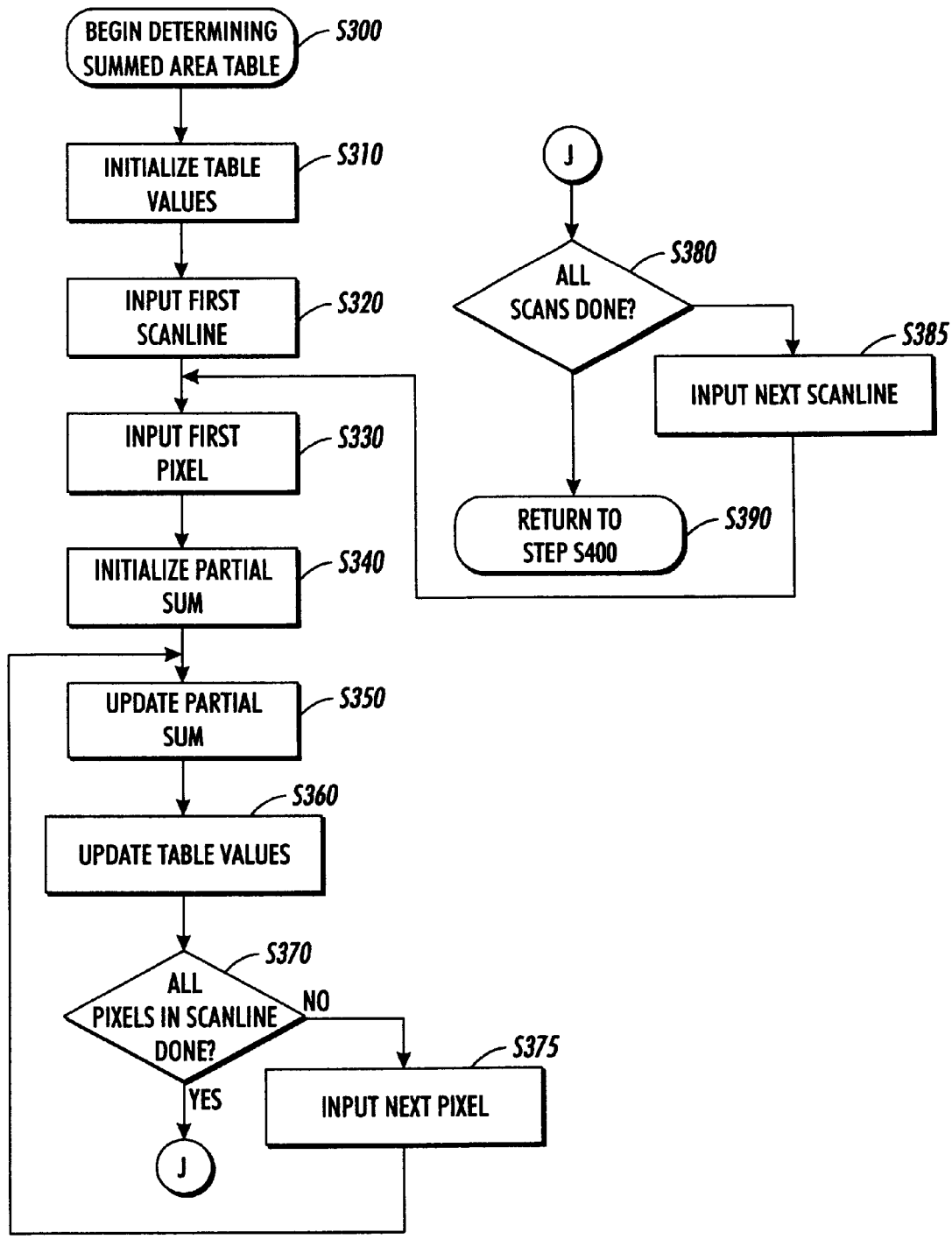
FIG. 5 is a flowchart outlining in greater detail one exemplary embodiment of the band-pass filtering step of FIG. 4.

FIG. 5 outlines in greater detail one exemplary embodiment of determining the summed-area table in step S300. Control begins in step S300. In step S310, the table values are initialized. For example, the table value can be initialized with a few lines of data, e.g. zeros. Next, in step S320, a first scanline is input as the current scanline. Control then continues to step S330.

In step S330, the first pixel is input as the current pixel. Next, in step S340, the partial sums are initialized. Then, in step S350, the partial sum is updated. Control then continues to step S360.

In step S360, the table values are updated. Then, in step S370, a determination is made whether all pixels in the current scanline have been processed. If all pixels have not been input, control continues to step S375. In step S375, the next pixel is input as the current pixel. Control then jumps back to step S350. Otherwise, if all of the pixels in the current scanline have been processed, control jumps to step S380.

In step S380, a determination is made whether all scanlines have been analyzed. If all scans have not been input, control continues to step S385. Otherwise, if all of the scanlines have been analyzed, control jumps to step S390.

In step S385, the next scanline is input as the current scanline. In contrast, in step S390, the control sequence returns to step S400.

It should be appreciated that while determining the summed-area table outlined in FIG. 5 has been described relative to determining the summed-area table values on a scanline-by-scanline and pixel-by-pixel basis, the summed-area table values can also be calculated on a scanline-by-scanline basis alone.

Figure 6:
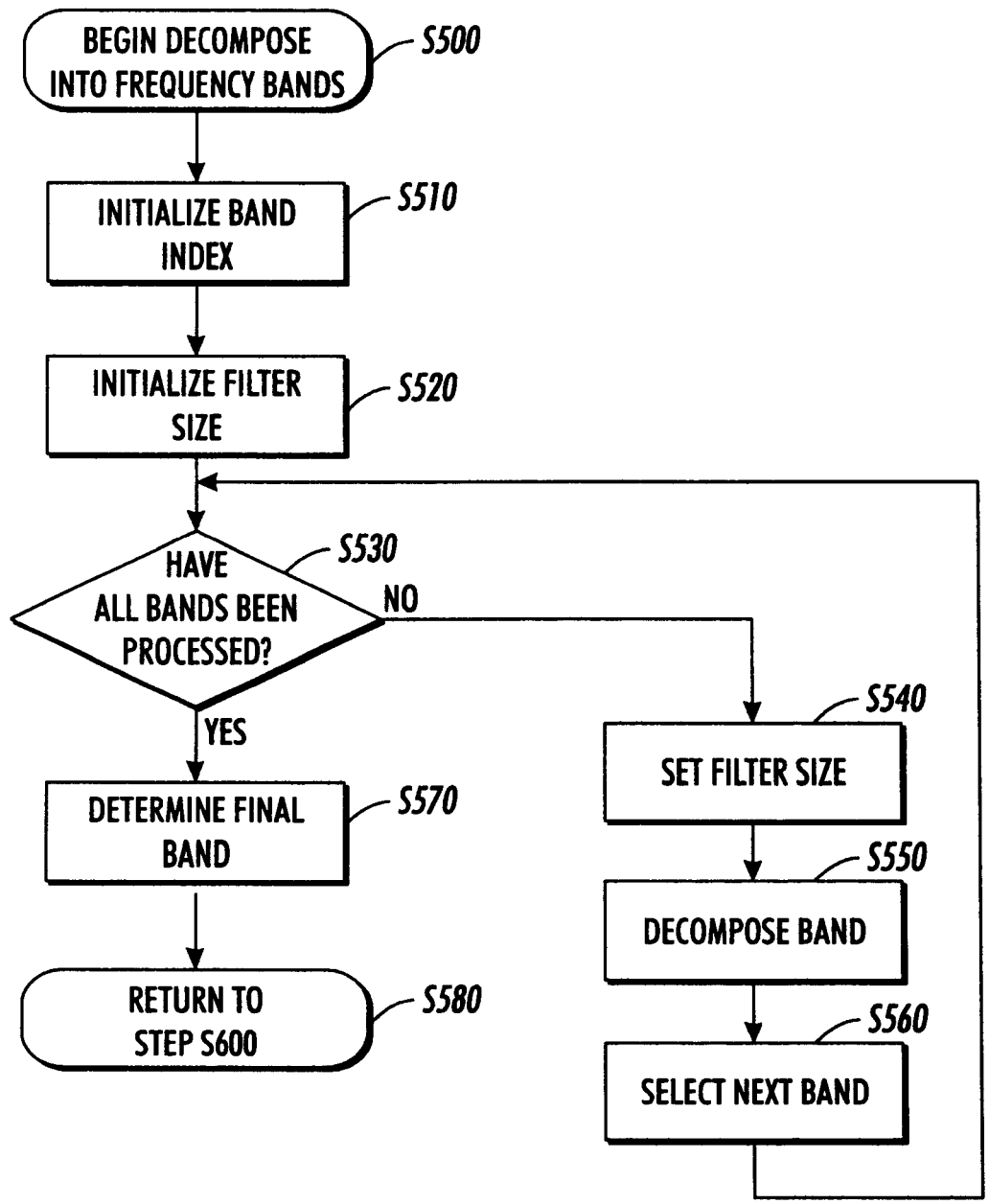
FIG. 6 is a flowchart outlining in greater detail one exemplary embodiment of the decomposing a pixel into frequency bands step of FIG. 4.

FIG. 6 outlines in greater detail one exemplary embodiment of the decomposing a pixel into frequency bands of step S500. Control begins in step S500. In step S510, the band index is initialized. Next, in step S520, the filter size is initialized. Then, in step S530, a determination is made whether all frequency bands have been processed. If all frequency bands have not been processed, control continues to step S540. Otherwise, if all bands have been processed, control jumps to step S570.

In step S540, the filter size is set. Next, in step S550, the band is decomposed. Then, in step S560, the next band is selected. Control then jumps back to step S530.

In step S570, the final band is determined. Then, in step S580, control returns to step S600.

As shown in FIG. 3, the white noise reduction system 100 is preferably implemented on a programmed general purpose computer. However, the white noise reduction device 100 can also be implemented on a special purpose computer, a programmed microprocessor or microcontroller and peripheral integrated circuit elements, and ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 4–6 can be used to implement the white noise reduction device 100.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of the invention.

What is claimed is:

1. A method for reducing white noise in an image comprising:

determining a summed-area table of the image values of the image;

selecting at least one portion of the image;

decomposing each selected portion into at least one frequency band;

filtering the at least one frequency band to remove noise;

reassembling, for each selected portion, the at least one frequency band into a corresponding filtered portion; and outputting the filtered image.

2. The method of claim 1, wherein selecting at least one portion of the image comprises selecting at least one pixel of the input image.

3. The method of claim 1, wherein decomposing each selected portion into at least one frequency band comprises:

initializing at least one band index;

initializing at least one filter size; and processing each frequency band.

4. The method of claim 3, wherein processing each frequency band comprises setting a filter size.

5. The method of claim 1, wherein determining the summed-area table comprises:

updating at least one summed-area table value based on the chosen portion and a previously updated summed-area table value.

6. The method of claim 5, wherein determining the summed-area table further comprises:

initializing at least one summed-area table value;

choosing each selected portion of the image;

initializing at least one partial sum for that chosen portion;

updating at least one partial sum based on that chosen portion; and updating the at least one summed-area table value based on the updated partial sum.

7. The method of claim 6, wherein determining the summed-area table for the chosen portion is determined on a pixel-by-pixel basis.

8. The method of claim 6, wherein determining the summed-area table for the chosen portion is determined on a scanline-by-scanline basis.

9. A white noise reduction device comprising:

a decomposer that decomposes the at least one input image into at least one frequency band, the decomposer including at least one summed-area table;

a threshold comparator that determines white noise in the at least one frequency band and outputs a thresholded frequency band;

a signal modifier that removes changes in the image that are determined to be white noise; and a band reassembler that re-combines the at least one thresholded frequency band.

10. The white noise reduction device of claim 9, wherein the decomposer includes at least one box filter.

* * * * *